(12) United States Patent
Grentz et al.

(10) Patent No.: US 8,333,051 B2
(45) Date of Patent: Dec. 18, 2012

(54) APPARATUS FOR BOXING FRUIT

(75) Inventors: Peter John Grentz, Wenatchee, WA (US); Arthur Lee Murison, Wenatchee, WA (US); Steven Archie Cochran, Wenatchee, WA (US)

(73) Assignee: Van Doren Sales, Inc., East Wenatchee, WA (US)

( * ) Notice: Subject to any disclaimer, the term of this patent is extended or adjusted under 35 U.S.C. 154(b) by 95 days.

(21) Appl. No.: 12/833,166

(22) Filed: Jul. 9, 2010

(65) Prior Publication Data
US 2012/0005986 A1 Jan. 12, 2012

(51) Int. Cl.
*B65B 25/04* (2006.01)
(52) U.S. Cl. ............................................. 53/244; 53/248
(58) Field of Classification Search .................... 53/235, 53/244, 247, 248; *B65B 25/04*
See application file for complete search history.

(56) References Cited

U.S. PATENT DOCUMENTS

| | | | |
|---|---|---|---|
| 1,647,356 A * | 11/1927 | Hendry | 53/235 |
| 1,886,295 A * | 11/1932 | Morris | 53/248 |
| 3,000,162 A * | 9/1961 | Carlsen et al. | 53/248 |
| 3,254,755 A * | 6/1966 | O'Brien | 414/295 |
| 4,194,343 A | 3/1980 | Myers et al. | |
| 4,446,670 A * | 5/1984 | Compagnoni | 53/244 |
| 4,570,419 A * | 2/1986 | Tinsley | 53/247 |
| 4,765,453 A * | 8/1988 | Bucher | 53/247 |
| 4,860,882 A * | 8/1989 | Maeda et al. | 198/458 |
| 5,440,826 A | 8/1995 | Whatley | |
| 5,440,862 A * | 8/1995 | Sanchez-de-Leon-Rodriguez-Roda | 53/247 |
| 5,502,940 A | 4/1996 | Fifield | |
| 5,502,949 A * | 4/1996 | Main et al. | 53/247 |
| 5,598,771 A | 2/1997 | Main et al. | |
| 5,794,415 A | 8/1998 | Huff et al. | |
| 6,726,002 B2 * | 4/2004 | van Wijngaarden et al. | 53/248 |
| 6,811,021 B1 * | 11/2004 | Corley | 198/690.2 |
| 7,980,382 B2 * | 7/2011 | De Greef | 53/244 |
| 2005/0098408 A1 * | 5/2005 | Shackelford et al. | 198/453 |
| 2008/0066429 A1 * | 3/2008 | De Greef | 53/244 |

FOREIGN PATENT DOCUMENTS

| | | | |
|---|---|---|---|
| EP | 858949 A1 * | 8/1998 | |
| EP | 1270422 A1 * | 1/2003 | |
| EP | 1847460 A1 * | 10/2007 | |
| FR | 2696151 A1 * | 4/1994 | |
| JP | 63247219 A * | 10/1988 | |
| WO | WO 00/12415 A1 * | 3/2000 | |

* cited by examiner

*Primary Examiner* — Stephen F Gerrity
(74) *Attorney, Agent, or Firm* — Priya Sinha Cloutier

(57) ABSTRACT

An apparatus that allows a storage bin to be evenly loaded while providing an environment which prevents fruit from colliding into machinery and into each other.

17 Claims, 18 Drawing Sheets

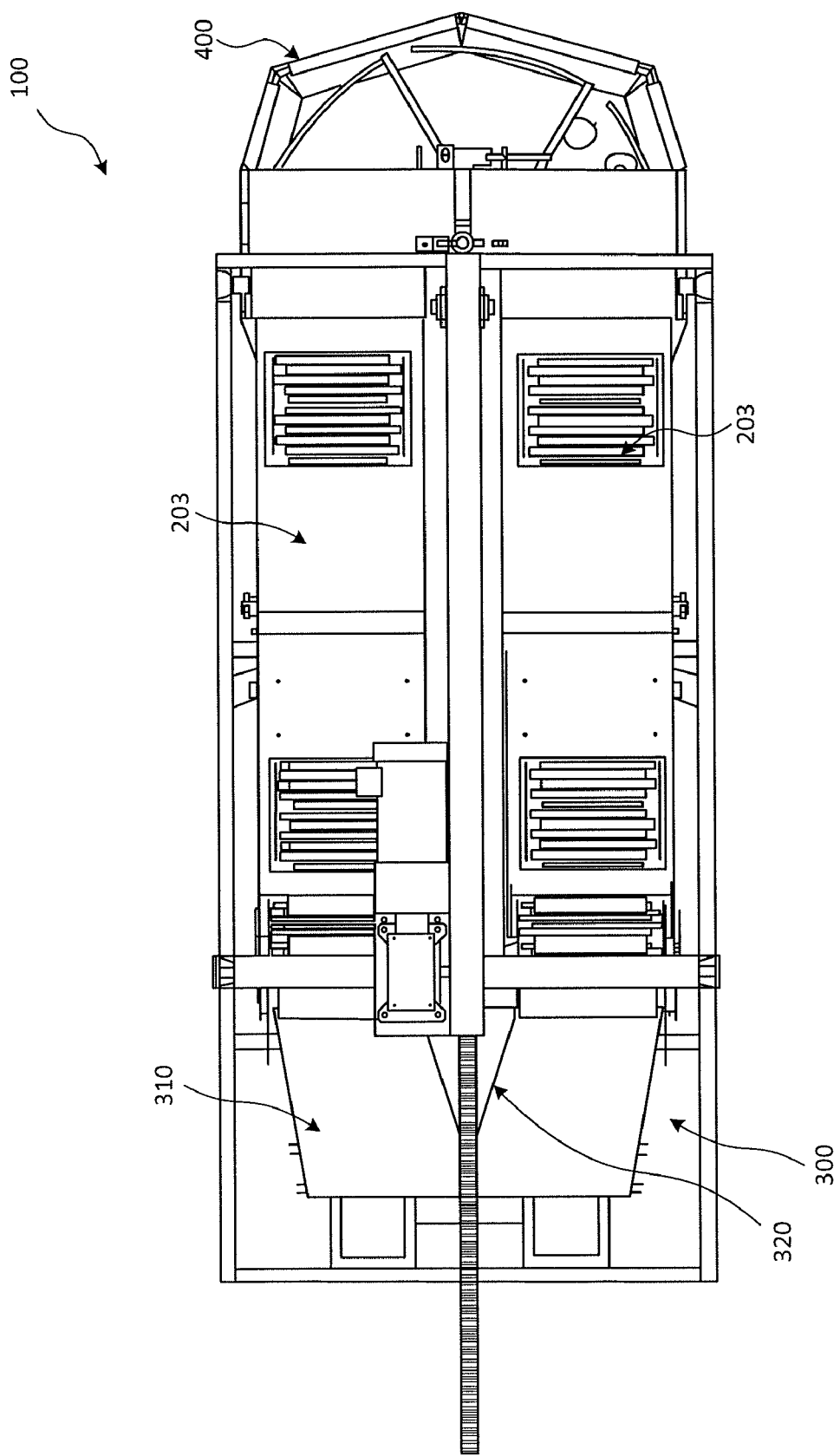

APPARATUS FOR BOXING FRUIT

CROSS-REFERENCES TO RELATED APPLICATIONS

NOTE TO SELF TO FILL IN PRIORITY INFORMATION

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

Apples and other similar fruits are grown all over the world and every apple grower has the same concern—reducing the apples that are bruised before sale. In most cases, after apples are picked they are sent to a packing factory where they are washed (and sometimes waxed), sorted according to size, and then deposited in storage bins. Sorting is automated. Apples may be evaluated for color, sugar content, size, or some combination thereof while moving through a series of conveyors. The sorted apples are loaded into an appropriate storage bin.

Apples that are sold for eating or baking have shiny skin, are firm, and are free of bruises. Not only is bruising unappealing to the eye but it can also become a source of bacterial growth. Apples that are bruised are sold for processed products such as juice. Bruised apples are sold for up to several hundred dollars per ton less than apples sold for eating or baking.

Most apples are bruised when they moved from a supply conveyor to large bins for storage. This bruising usually occurs when the apple lands into a storage bin at high velocities, when apples collide with each other, and when apples collide with machinery.

Efforts have been made to reduce bruising when apples are moved from a supply conveyor belt into storage bins. For example, Fruit Handling Systems, www.fruithandling.co.nz, and Durand Wayland, www.durand-wayland.com, produce rotating head bin fillers. Since both systems are comparable, they are referred to, individually and in combination, as the fill apparatus. As can be seen in FIG. 1, the fill apparatus (10) accepts fruit from the supply (or sorting) conveyor (20) into the fill conveyor (11). The fill conveyor (11) moves the apples to a rotating arm (12). The purpose of the rotating arm (12) is to decrease the velocity of apples as they move from the sorting conveyor (20) into a storage bin (30). The rotating arm (12) is separated into segments by a plurality of steel rods. Each steel rod is dressed with a small chute which delivers the fruit from the rotating arm to the storage bin (30). The chutes also lower the velocity of the fruit as it moves from a higher level, the supply conveyor (20), to a lower level, a storage bin, preventing fruit from colliding with the storage bin or other fruit. The fill apparatus (10) also has a single sensing device indicating when a storage bin (30) is full.

The fill apparatus (10) has multiple drawbacks. If fruit is loaded unevenly onto the fill conveyor (11), it will be loaded unevenly into the storage bins. As a consequence, the fruit will fall from a higher location, in the storage bin, to a lower location causing fruit collision and bruising. Additionally, if the storage bin (30) is loaded unevenly, the sensor may stop the filling process prematurely reducing fill efficiency. If fruit has not achieved a sufficiently low velocity after leaving the chute (14), the fruit may also collide into the edge of the storage bin (30) causing the fruit to bruise.

BRIEF SUMMARY OF THE INVENTION

It is therefore, a purpose of this invention to provide an apparatus that allows a storage bin to be efficiently and evenly loaded while providing an environment which prevents fruit from colliding into each other and into machinery.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which:

FIG. 2C is a top view of the invention disclosed herein.

DETAILED DESCRIPTION OF THE INVENTION

In the description of the invention above and in the detailed description of the invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. Referring now in detail to the FIGS. 2A through 6B, wherein the same call out numbers are used where applicable, an apparatus for transferring dry fruit, or other similar matter, gently into storage bins so that the fruit does not bruise (hereinafter "Apparatus") is described in accordance with an embodiment of the invention is identified generally as the reference number 100.

Figure 1:
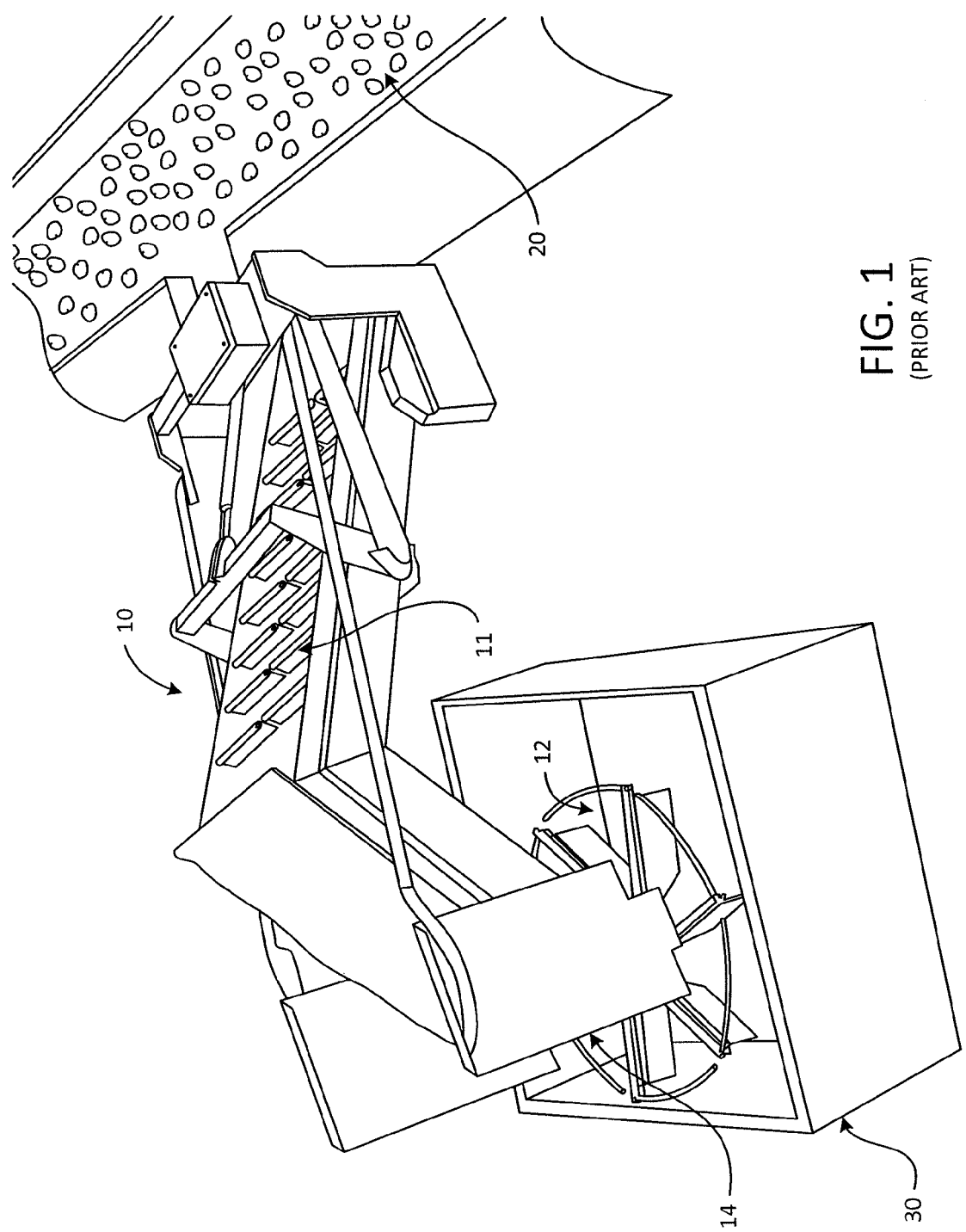
FIG. 1 is a perspective view of a prior art bin filler.
Figure 2A:
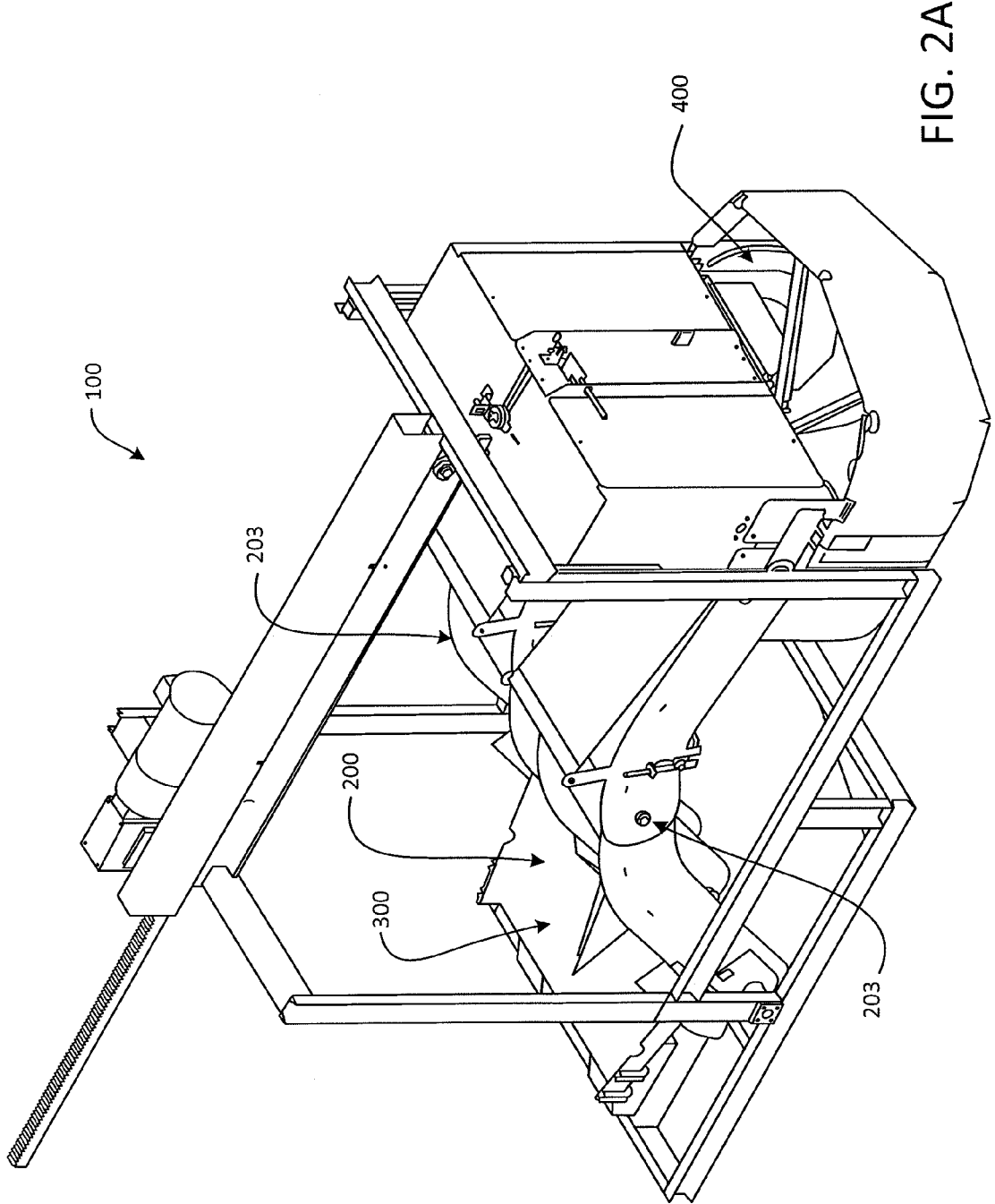
FIG. 2A is a perspective view of a preferred embodiment of the invention disclosed herein.
Figure 2B:
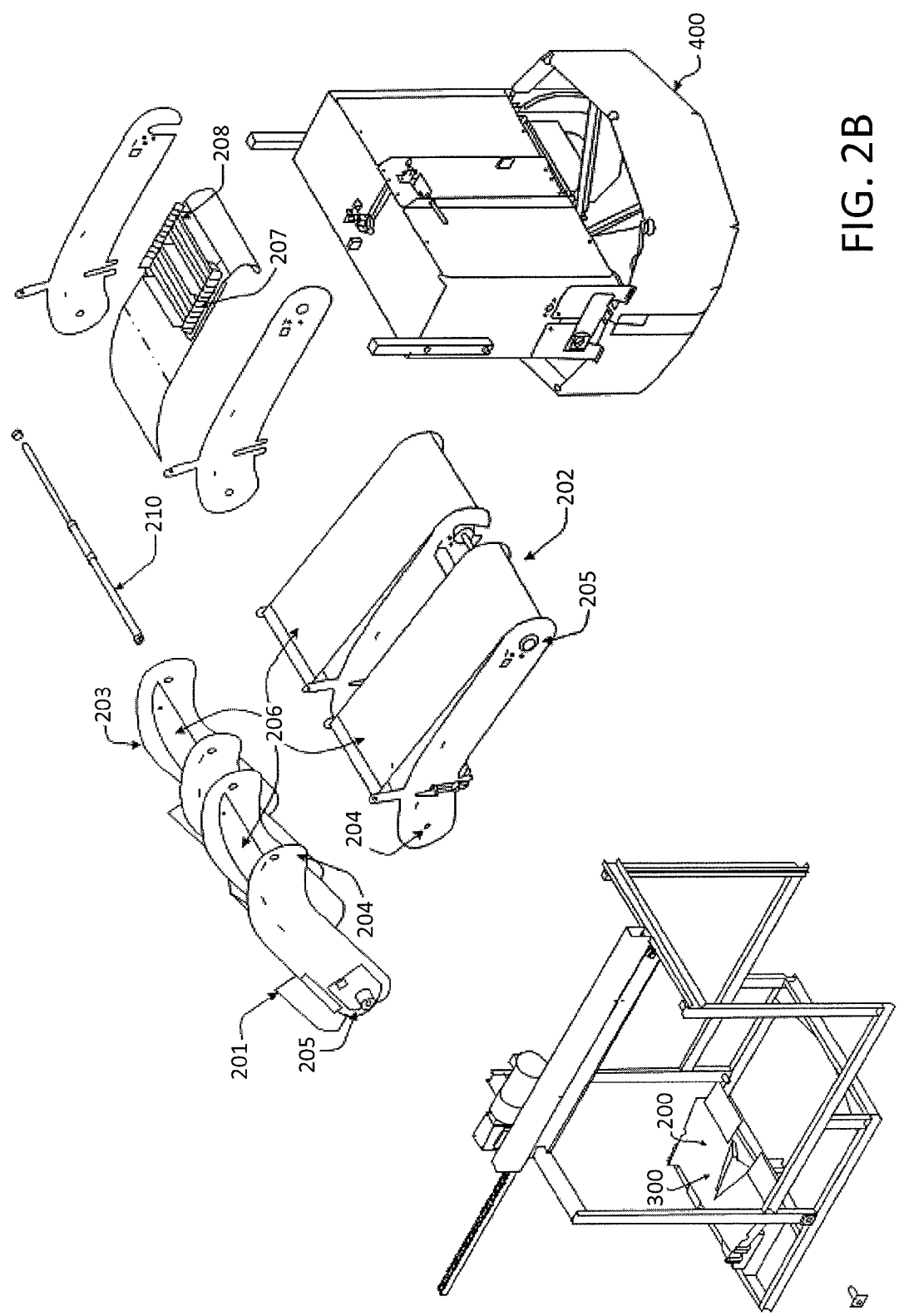
FIG. 2B is an exploded view of the invention disclosed herein.
Figure 2D:
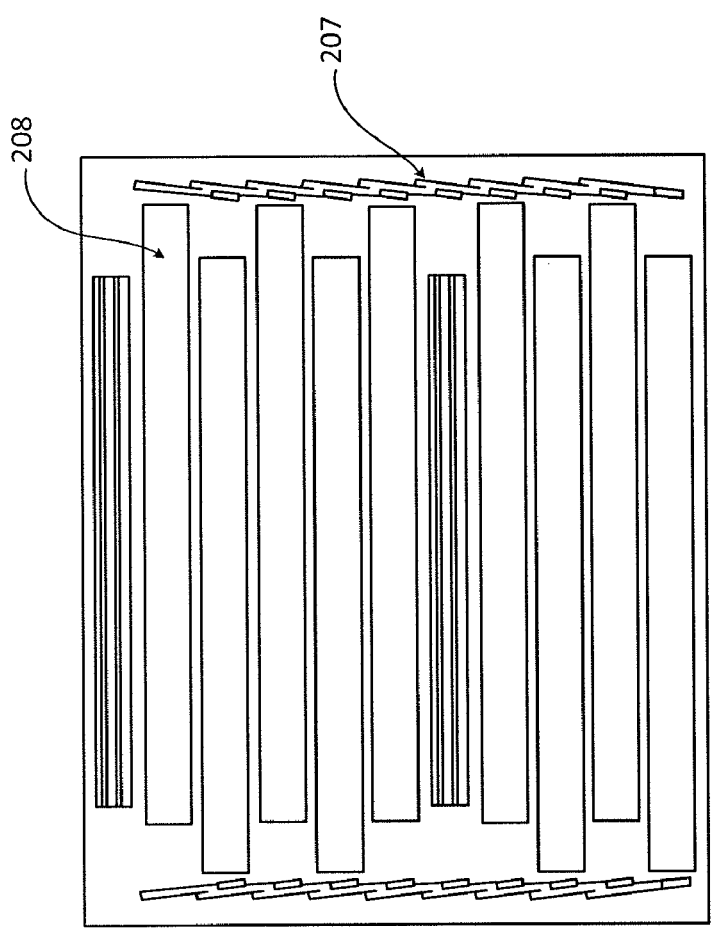
FIG. 2D is a top view of a conveyor belt.

The Apparatus (100) is generally shown in FIGS. 2A and 2B as having at least two elongated conveyors systems (200), a vibrating brush assembly (300), and a discharge head (400). The elongated conveyor system (200) is comprised of two parallel frame assemblies (203) and two conveyor belts (206).

The frame assemblies (203) consist of two portions—an inlet portion (201) and an outlet portion (202). The inlet portion (201) accepts fruit from the vibrating brush assembly (300) which accepts feed from a supply conveyor (20), for example. The outlet portion (202) is attached to the discharge head (400). The inlet portion (201) and the outlet portion (202) have a near end (204) and a far end (205). The inlet portion (201) and outlet portion (202) of the frame assemblies (203) are hinged together 210) at the near end (204). The hinged frame assemblies (203) allow the discharge head (400) to travel in the vertical direction as a storage bin fills.

Referring to FIG. 2B, the two conveyor belts (206) have integrated side flights (207) and flat top base flights (208). In its preferred embodiment, the conveyor belts (206) are fabricated from polypropylene approved by the FDA. However, it will be obvious to a person having ordinary skill in the art that the conveyors (200) can be fabricated with any thermoplastic polymer or other similar material having properties approved by the FDA for food handling. The conveyor belts (206) are sprocket driven.

Figure 2E:
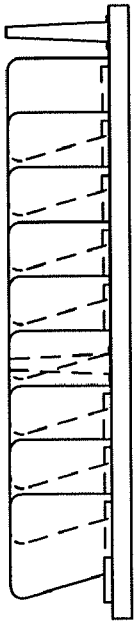
FIG. 2E is a front end view of a conveyor belt.
Figure 2F:
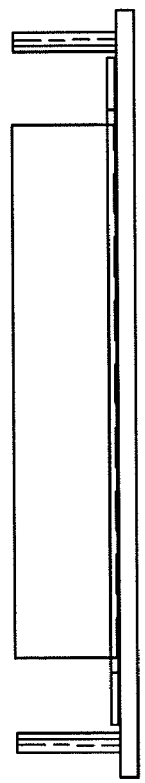
FIG. 2F is a side view of a conveyor belt.
Figure 2G:
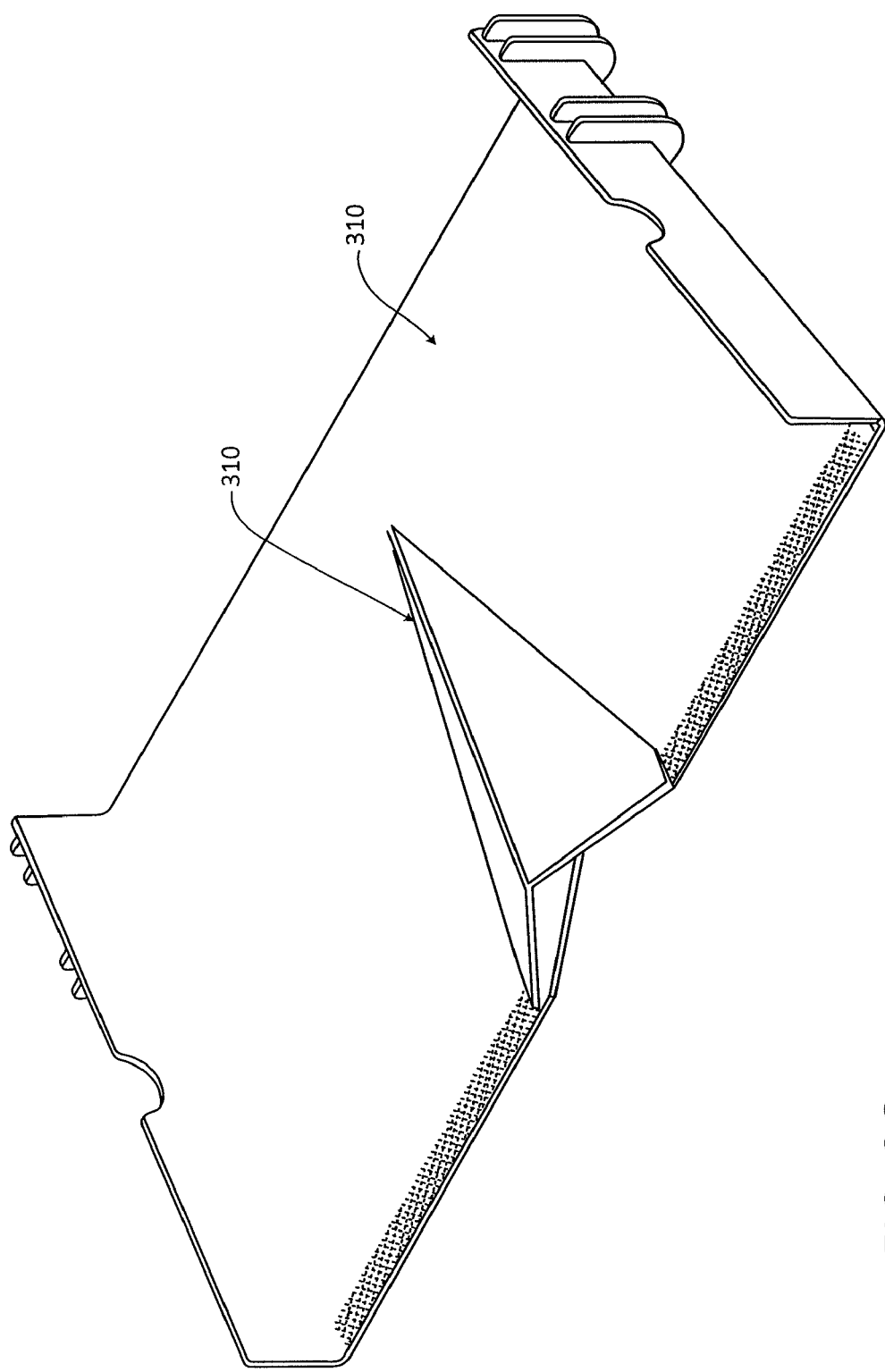
FIG. 2G is a perspective view of the vibrating brush assembly.

Referring to FIGS. 2C and 2E, the vibrating brush assembly (300) is located at the inlet portion (201) of the frame assemblies (203). The vibrating brush assembly (300) is comprised of directional brushes (310), a triangular projection (320), and a sensor (not shown). The sensor is located in the vibrating brush assembly (300) at the same location as the directional brushes (310). The directional brushes (310) gently accept fruit from the supply conveyor (20) and move the fruit to the triangular projection (320).

Optimally, the directional brushes (310) are made from nylon bristle and are glued within the vibrating brush assembly (300) at an angle of 45 degrees to the direction of fruit flow from the supply conveyor (20). And, optimally, the triangular projection (320) is embedded on the vibrating brush assembly and projects approximately 20 degrees off the vertical. The bristles of the directional brush are tilted 20 degrees off of vertical downstream, towards the discharge head (400), to promote movement.

The combination of directional brushes (310), triangular projection (320) and a reflective photo eye sensor equally splits a single flow of fruit coming from a supply belt to the parallel framed assemblies (203). Additionally, the reflective photo eye sensor allows for automated operations.

The photo eye sensor has two modes—off and on. When in the on mode, fruit accumulates in the vibrating brush assembly (300) until the photo eye sensor "sees" the fruit. Once the photo eye sensor "sees" the fruit, the conveyor belts (204) turn on for a predetermined period of time, carrying the fruit towards the discharge head (400). After the predetermined period of time, the conveyor belts (204) stop moving and fruit is allowed to accumulate. This operating system allows more gentle conveyance of fruit from the feed.

Referring to FIGS. 3A through 4D, the discharge head (400) is a rotating wheel that has a plurality spokes (401) and is positioned at a ninety degree angle from the conveyor belt system (200). The spokes (401) are attached to a hub (420) and that hub (420) is attached to a drive shaft (403). The drive shaft (403) is attached to a gear box which synchronizes the conveyor (200) with rotation of the spokes (401). The drive shaft (403) is hollow.

Optimally, the conveyor (200) to discharge head (400) rotation is 3 to 1 and the discharge head (400) has six spokes (401). Fewer/greater spokes reduces the amount of fruit that safely enters the discharge head (400) at one time. With six spokes, the Apparatus (100) can load, depending on fruit size, approximately 16-19 bins per hour. Prior art fillers load approximately 12 bins per hour.

A section arm (404) extends from each spoke (401). Each section arm (404) and spoke (401) defines an open space (405).

The conveyor (200) flat top base flights (208) are synchronized with each section of the discharge head. This is accomplished with a right angle thru bore helical gear box (420). The drive shaft (403) is located at the approximate center of the discharge head (400) and each spoke (401) is attached to this drive shaft (403). Each spoke (401) of the discharge head (400) is attached to a paddle (402) that swings freely. Each paddle (402) is attached to a spoke (401) using ¼" rod. The ¼" rod mates with the sensor actuator. Each ¼" rod has an inside end and an outside end. The inside end of each ¼" rod is comprised of a disc which mates with the sensor actuator and actuates a proximity switch. When the proximately switch is activated, the discharge head (400) raises to allow even flow of fruit into the storage bin.

The paddles (402) in combination with the sensor actuator and the proximity switch, are known as the sensor actuating assembly. The proximity switch looks for the sensor actuator. When the sensor actuator is raised to a pre-set level, the Apparatus (100) raises. The level of the actuator is determined by each of the plurality of paddles (402). As the storage bin (30) fills, the paddles (402) are pushed in the upward direction by the fruit preventing uneven bin fill. Having a plurality of paddles (403) or sensors gives a more complete picture of the bin fill level.

Each section (404) accepts an elephant ear (410). Referring to FIGS. 4A-4F, an elephant ear is comprised of a rectangular portion (430) and an attachment arm (411). The rectangular portion (430) comprises of a top (412), a bottom (413), a front side (414), and a back side (415). In a preferred embodiment, the top (412) is made by sandwiching poron between nylon, and wraps around a spoke (401). The attachment arm (411) slides onto a section arm (404) and is made by sandwiching bubble wrap between nylon. The side of the rectangular portion (430) opposition to the attachment arm (411) is comprised of a bumper (431). The bumper (431) prevents the fruit from sliding off the edge of the elephant ear (410).

If the elephant ears (410) are too short, fruit enters the bin too quickly and distributes unevenly. If the elephant ears (410) are too long, the fruit never discharges into the bin. Optimally, the rectangular portion (430) of the elephant ear (410) is 31"×17".

Optimally, portions of the elephant ears (410) which need to be flexible are constructed by sandwiching bubble rap between eight ounce rip stop nylon. Although other material was tested (corduroy, velveteen, canvas), it was found that eight ounce rip stop nylon does not mar the fruit, is durable and flexible. Portions of the elephant ears (410) which do not need to be flexible are made by sandwiching poron between eight ounce rip stop nylon.

In the preferred embodiment, approximately ⅓ of the top (412) of the rectangular portion (430), the attachment arm (411), and bumper is made of the poron composition. The rest of the rectangular portion is made from bubble composition.

Each elephant ear (410) comprises at least 3 flaps (440). The flaps (440) reduce the velocity of the fruit as they enter the elephant ears (410) and prevent multiple fruit from colliding into each other as they enter the elephant ears (410).

Figure 5:
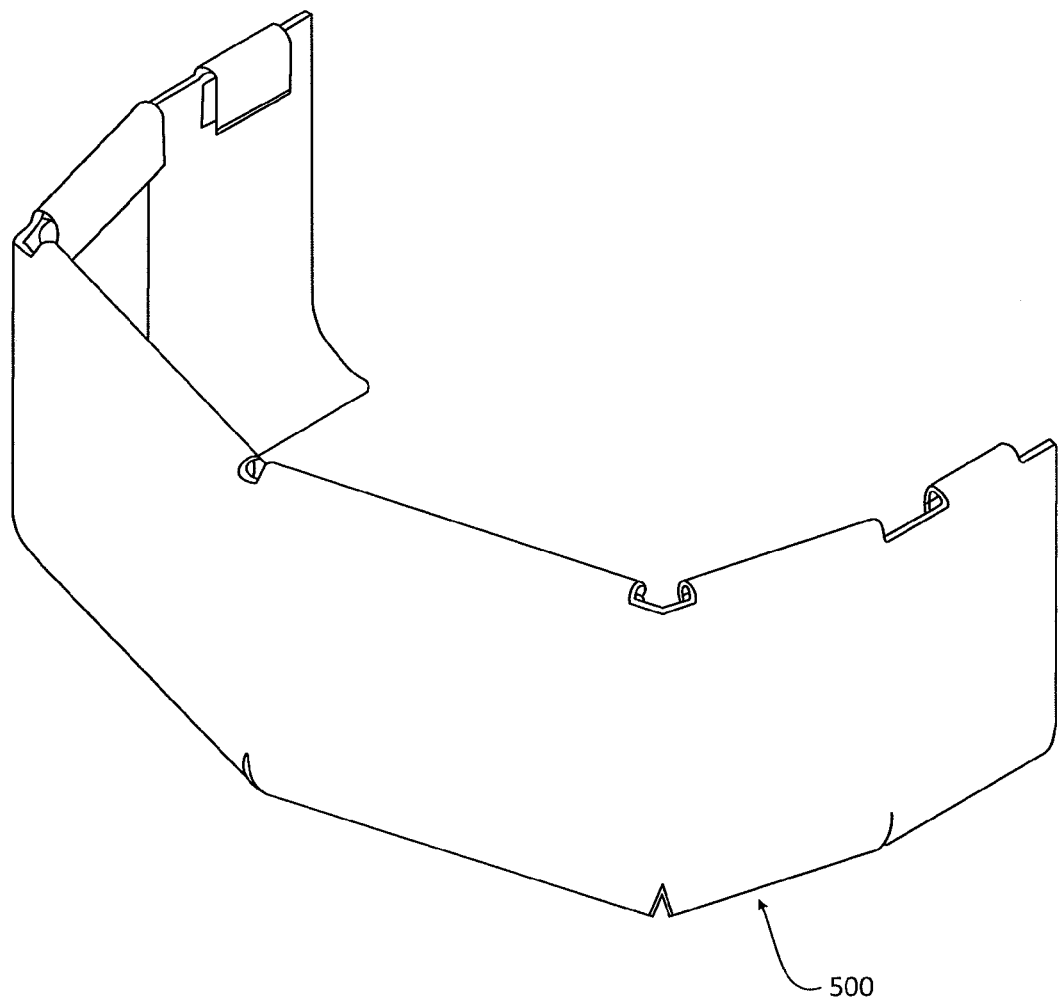
FIG. 5 is a perspective view of a halo curtain.
Figure 6A:
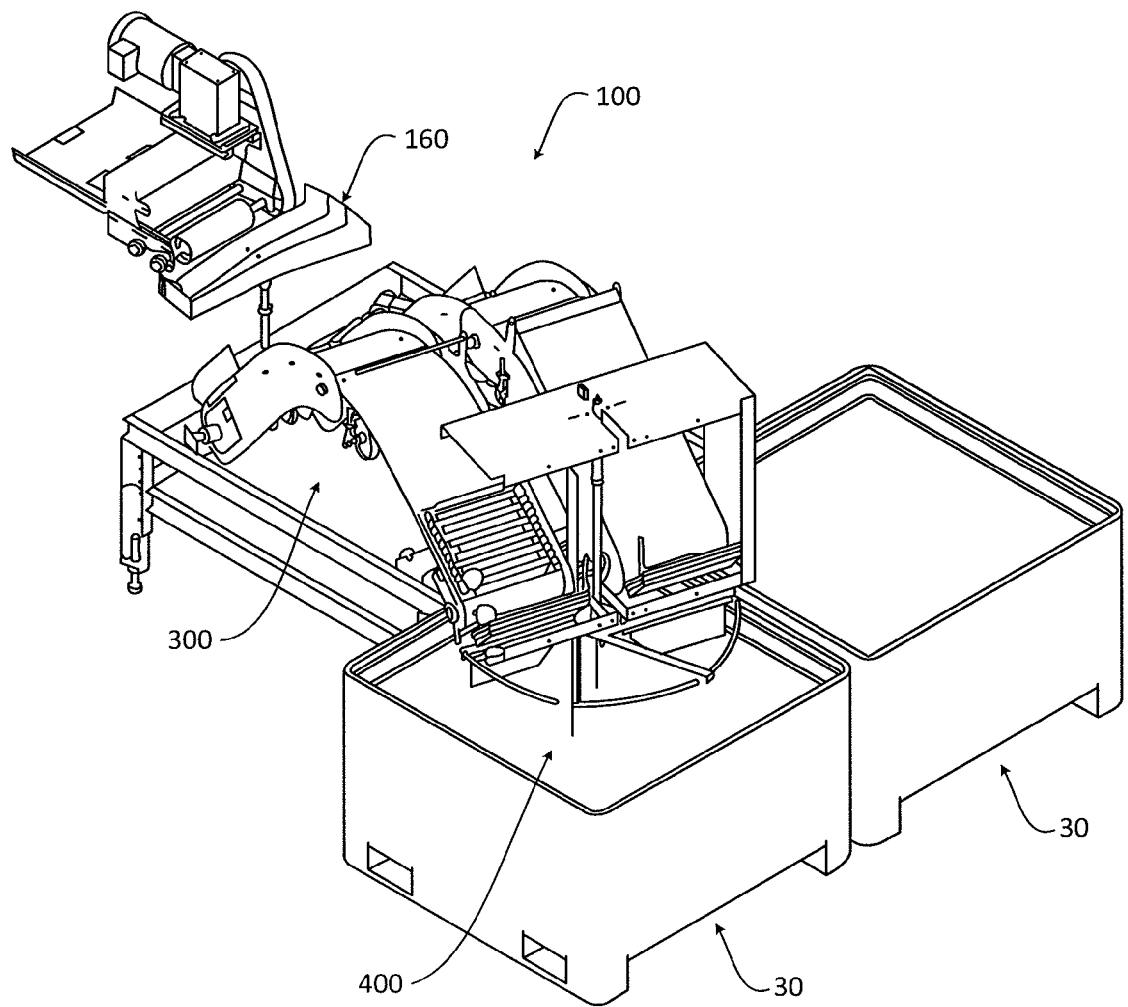
FIG. 6A is a perspective view of a preferred embodiment of the invention described herein.
Figure 6B:
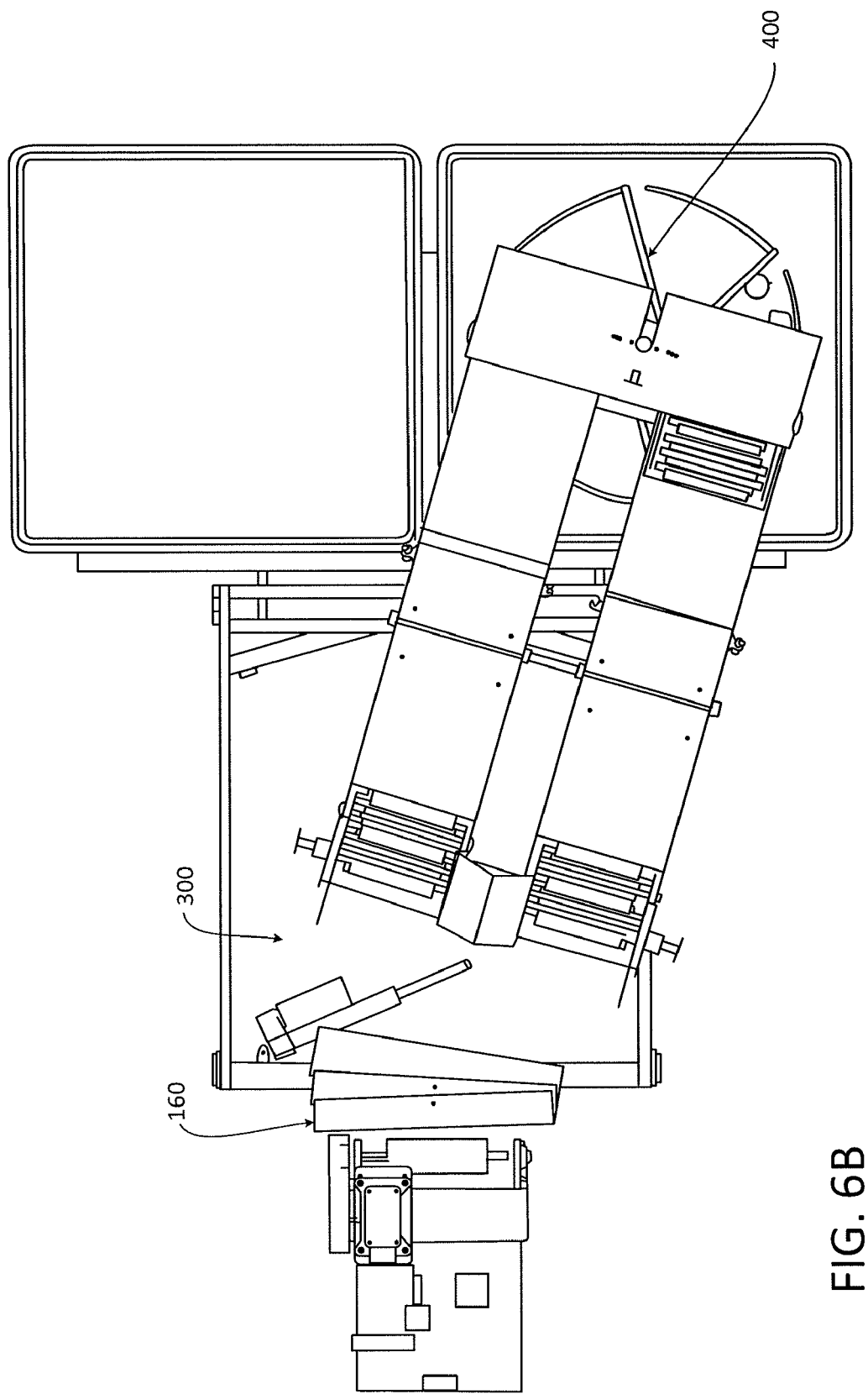
FIG. 6B is a perspective view of a preferred embodiment of the invention described herein.

Referring to FIG. 5, the Apparatus (100) further comprises a halo curtain (500). The halo curtain (500) sits inside a storage bin and completely curtains each all sides of the storage bin. The purpose of this curtain is to prevent fruit released from the elephant ears (410) from tumbling into the side of the storage bin. In the preferred embodiment, the halo curtain (500) is comprised of sandwiching Poron® in two layers of eight ounce rip stop nylon. Poron® is a trade name used to describe a particular type of Microcellular Urethane. This halo curtain (500) is framed by a self-supporting frame. The shape and size of the halo curtain (500) will be dependent on the storage bin. The halo curtain (500) is used in conjunction with the apparatus to reduce marring fruit.

Figure 3A:
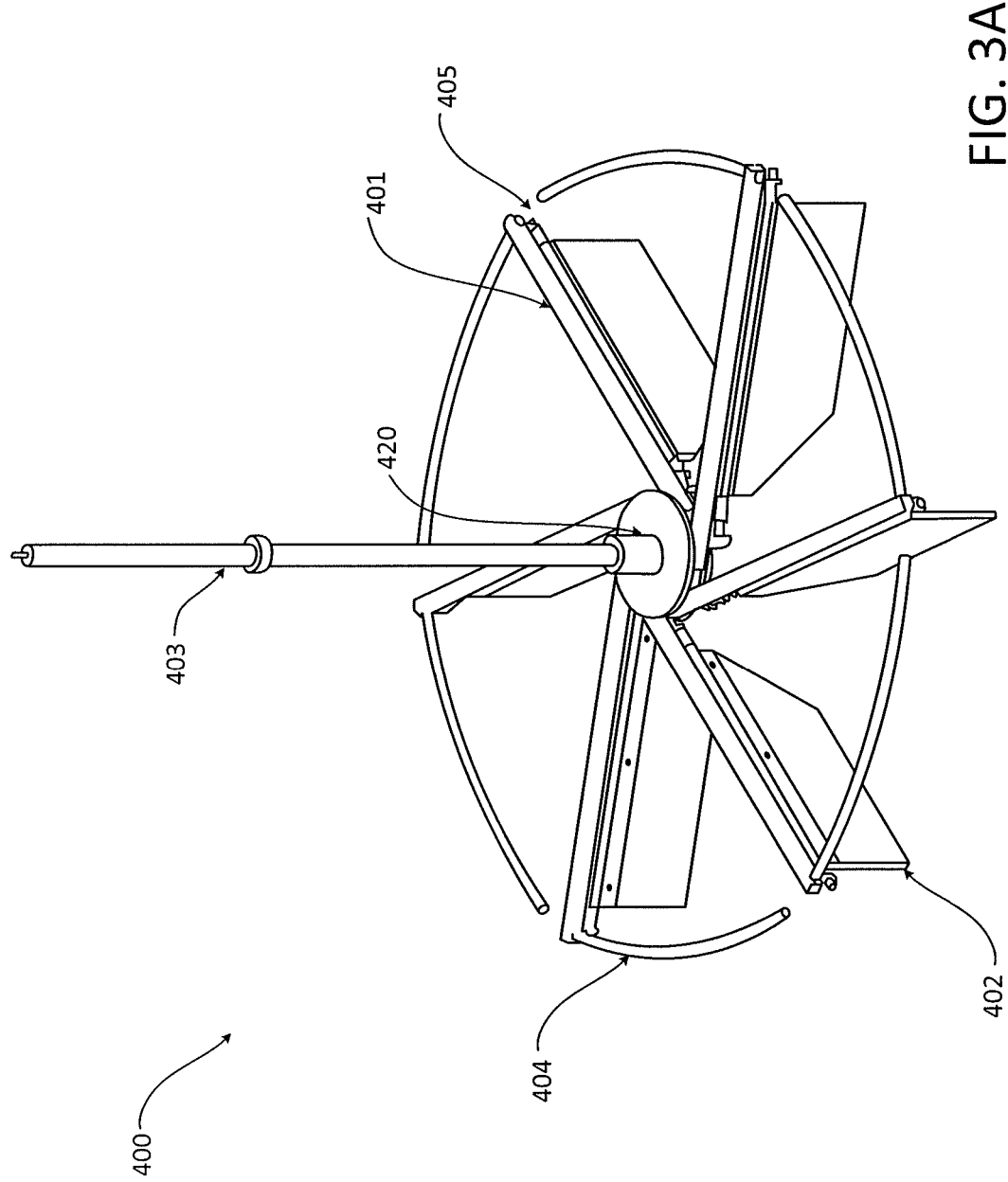
FIG. 3A is a perspective view of the discharge head.
Figure 3B:
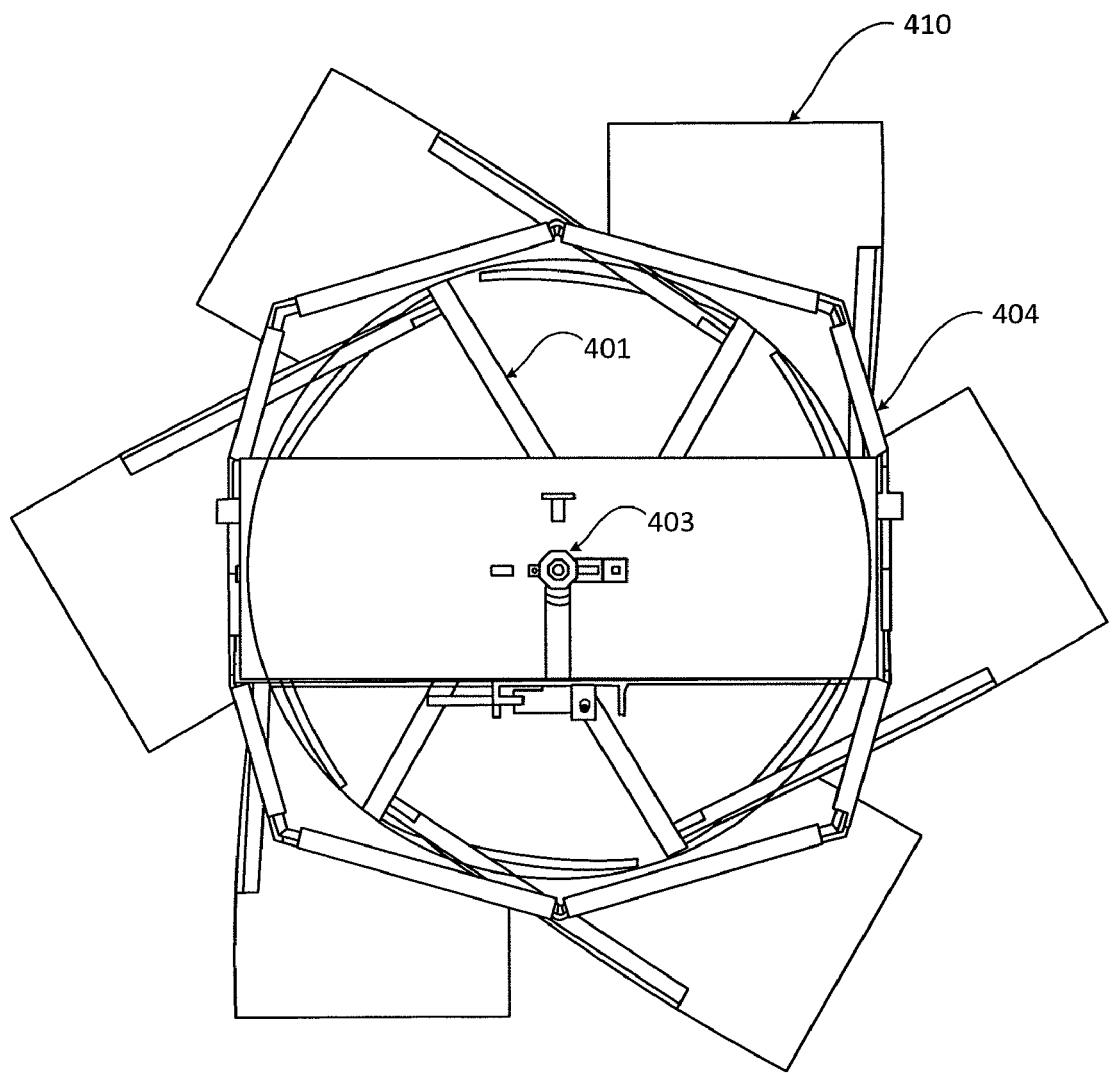
FIG. 3B is a top view of the discharge head where the drive shaft is shown within the gear box and dressed with elephant ears.
Figure 3C:
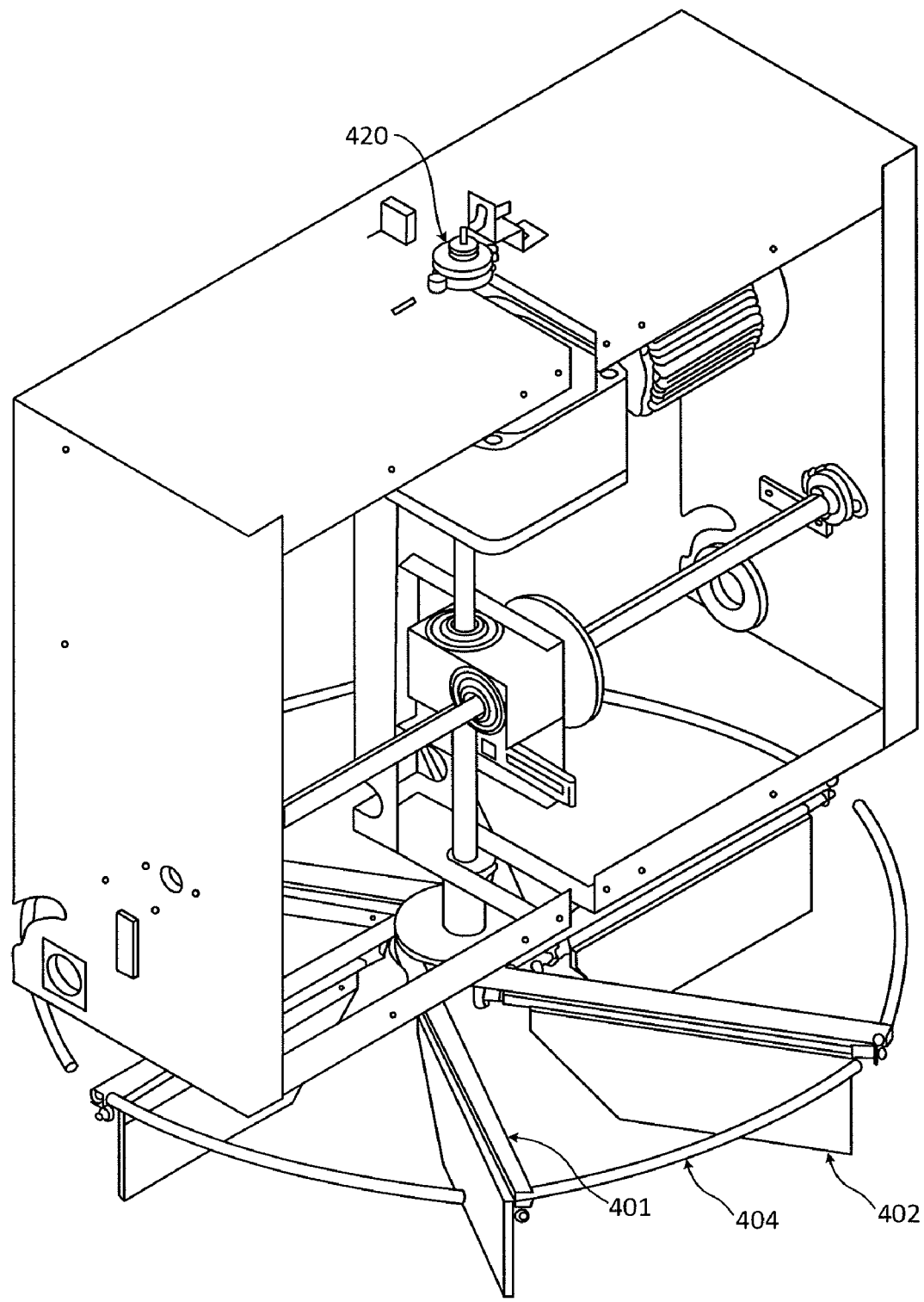
FIG. 3C is a perspective view of the discharge head and gear box assembly.
Figure 3D:
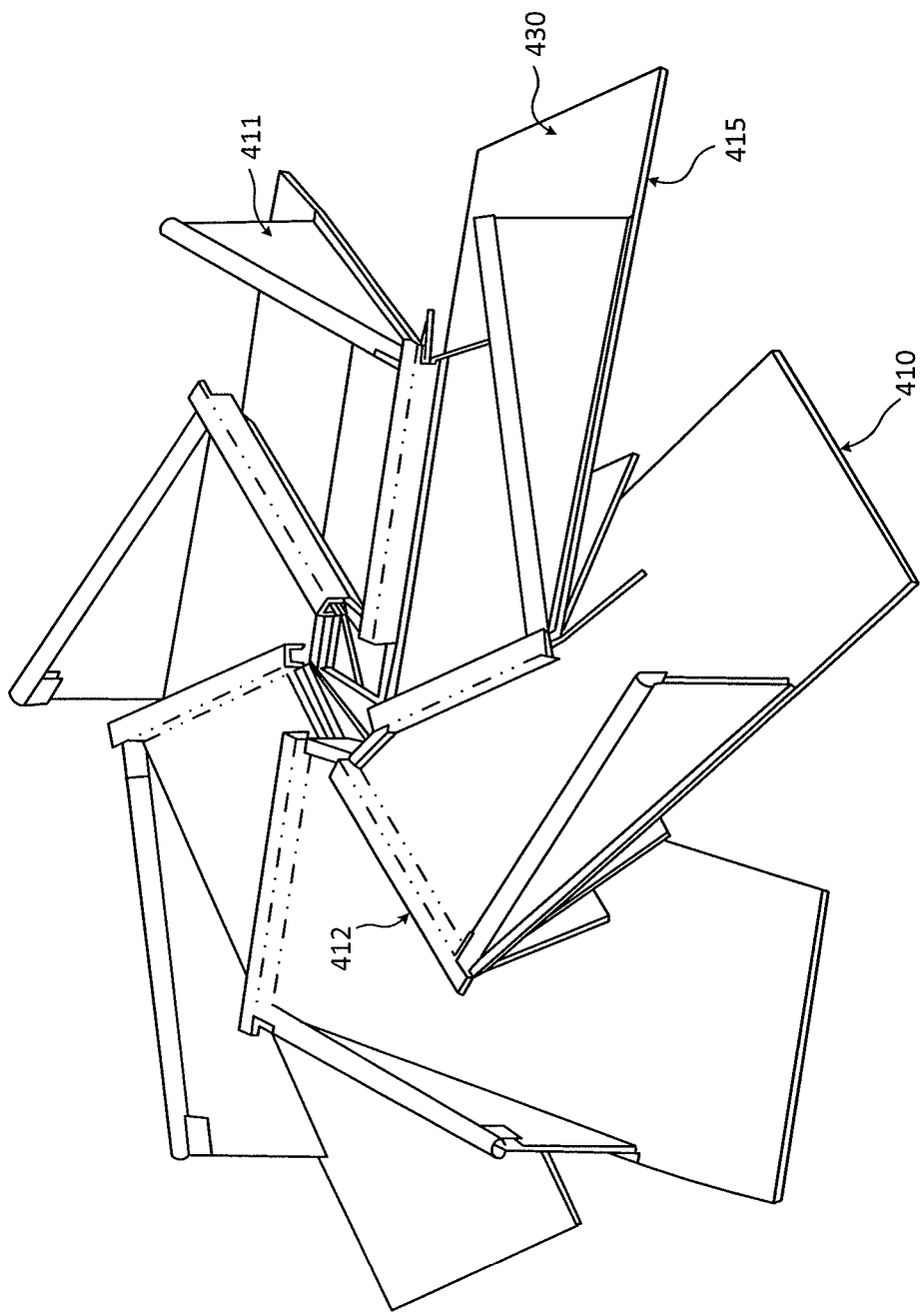
FIG. 3D is a perspective view of elephants ears assembled to show their configuration when loaded onto the discharge head.
Figure 4A:
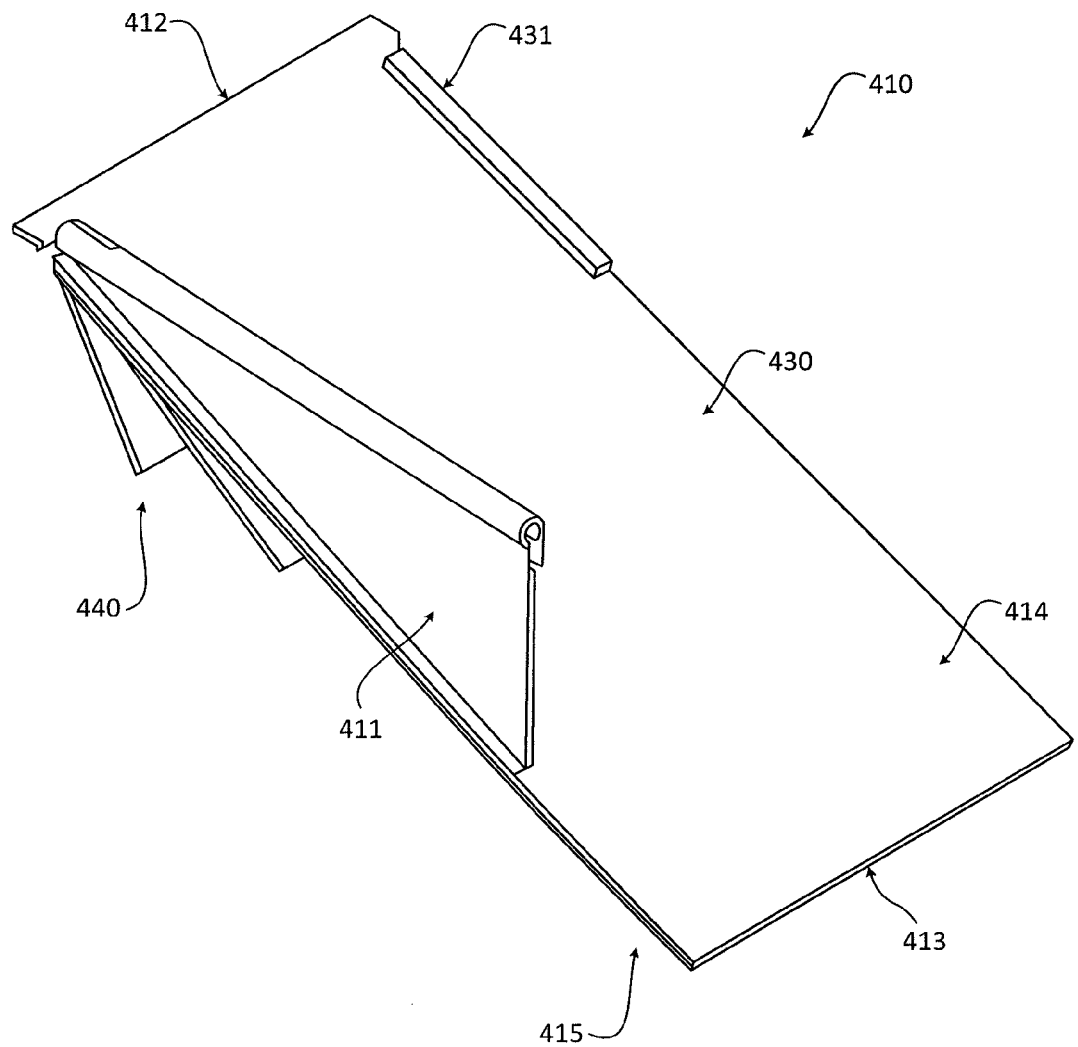
FIG. 4A is a perspective view of an elephant ear.
Figure 4B:
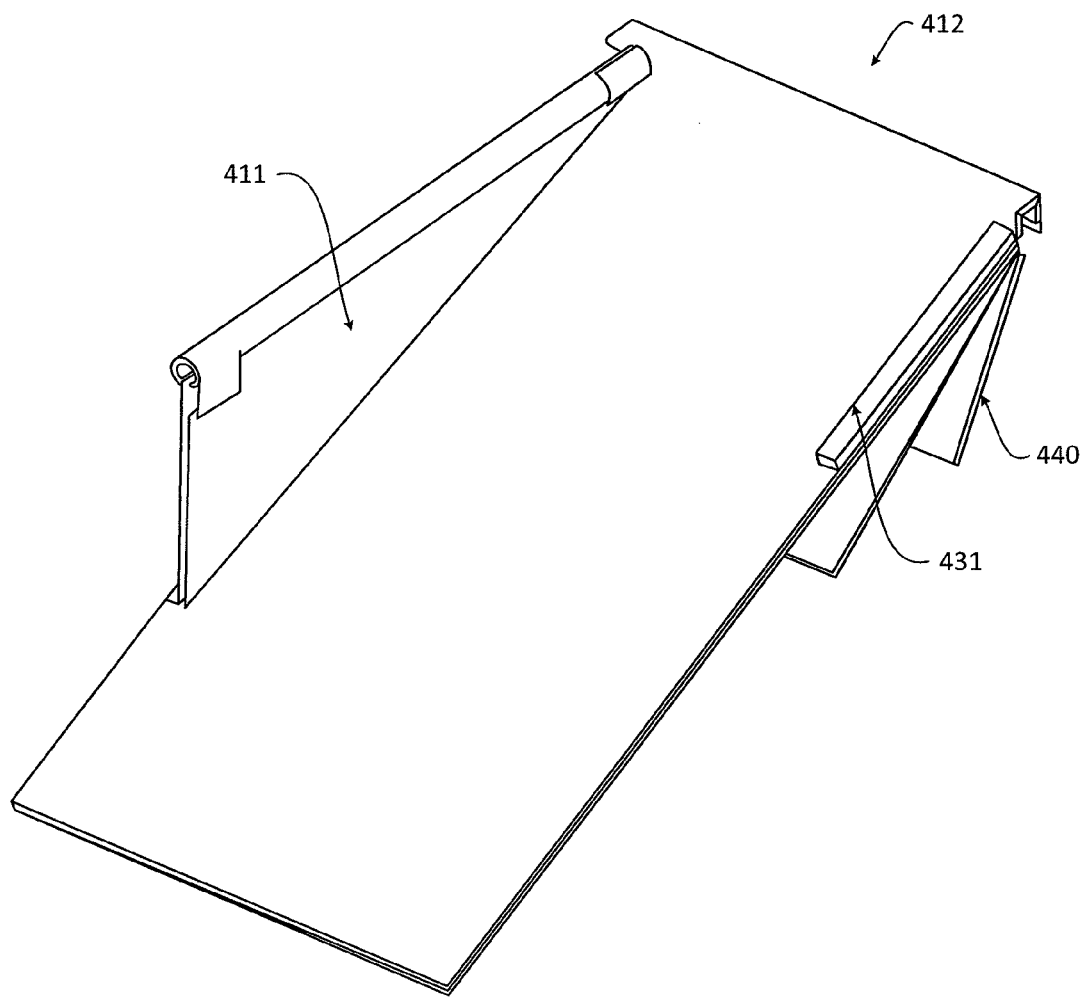
FIG. 4B is a perspective view of an elephant ear.
Figure 4C:
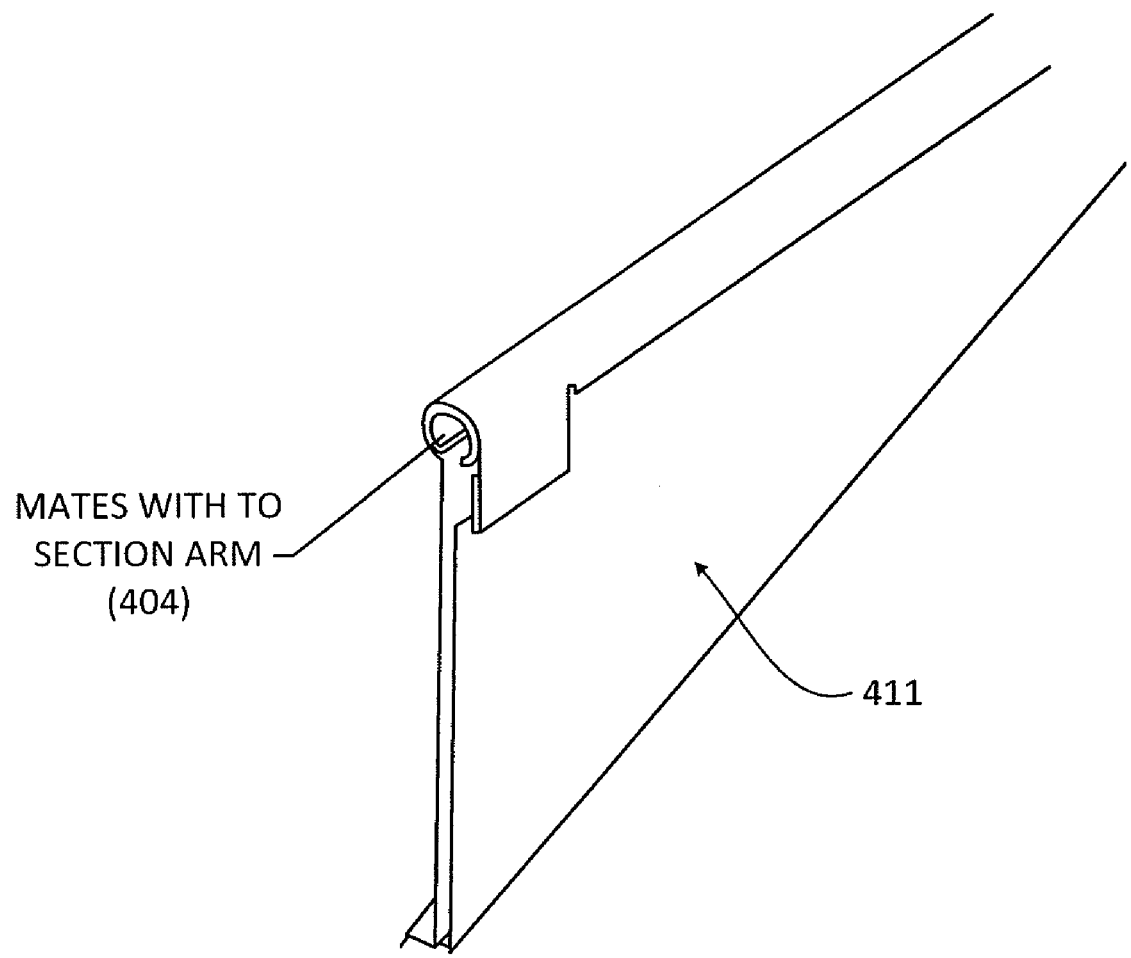
FIG. 4C is an exploded view of the attachment arm showing the cavity that mate with the section arm.
Figure 4D:
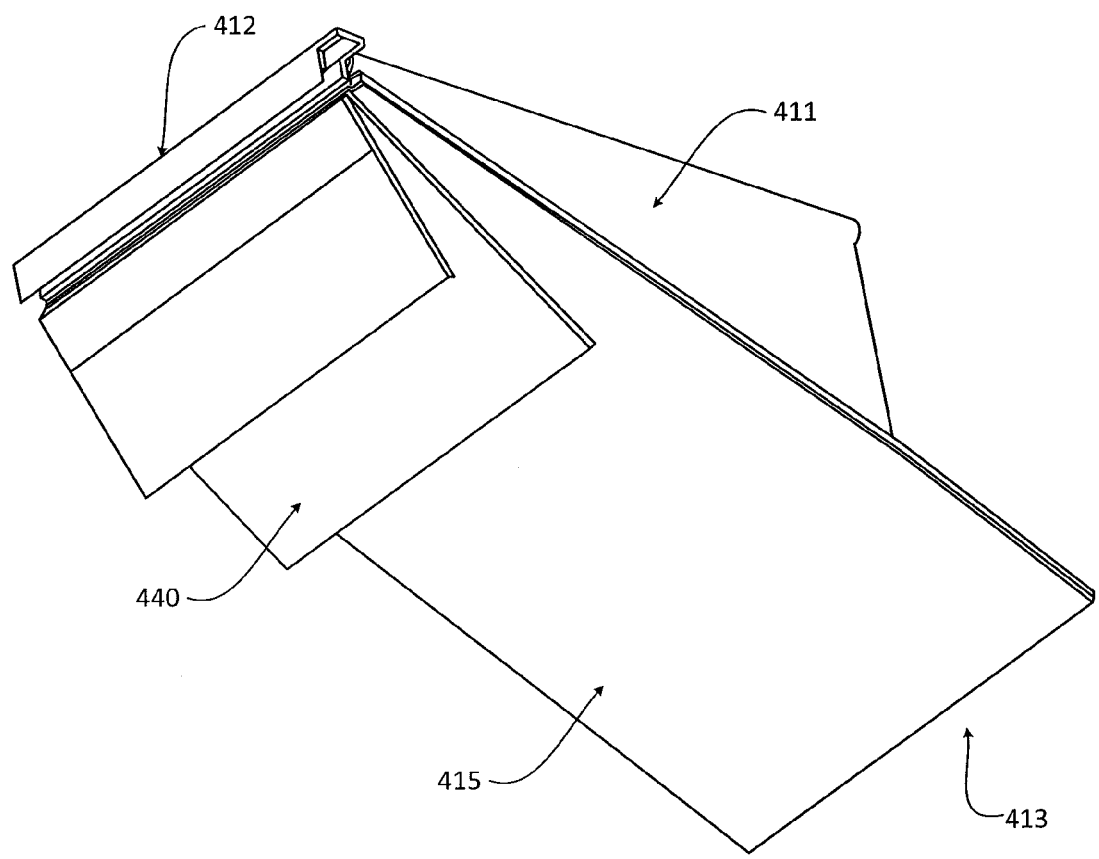
FIG. 4D is a bottom perspective view of the elephant ear.
Figure 4E:
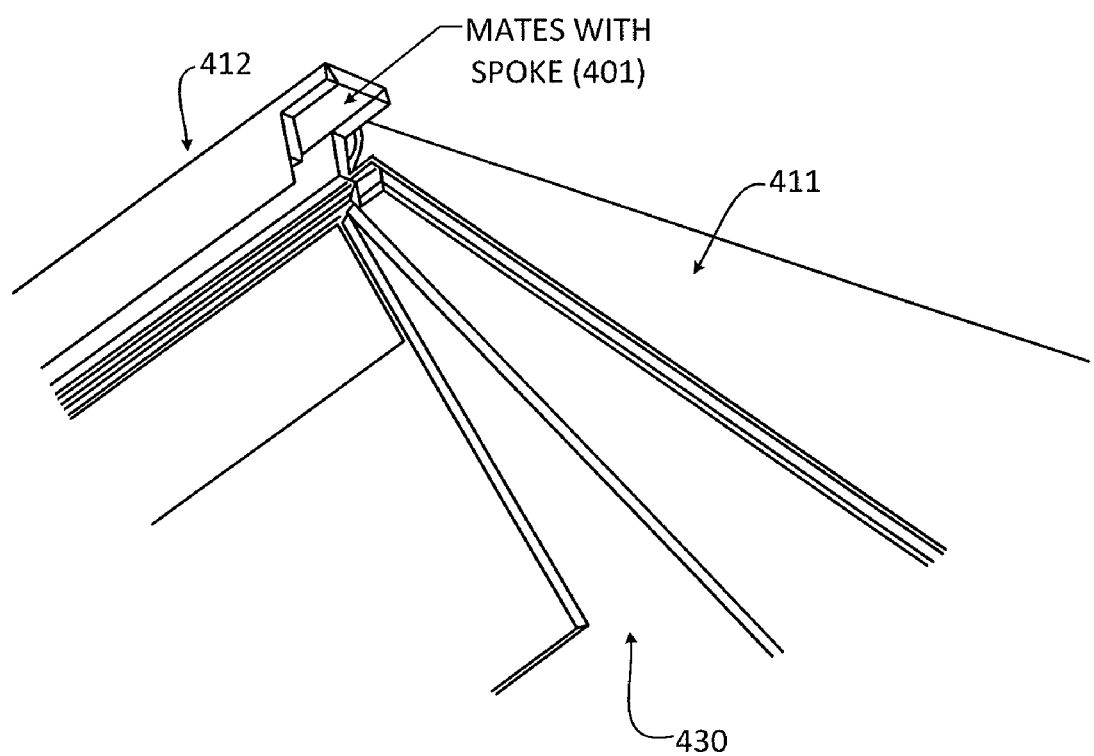
FIG. 4E is an exploded view showing the cavity that mates with a spoke.

In one preferred embodiment the Apparatus is stationary as shown in FIG. 3A. In a second, preferred embodiment, shown in FIGS. 6A and 6B, the Apparatus (100) also comprises an articulating arm (160) allowing the discharge head (400) to swing from one storage bin (30) to another.

The invention claimed is:

1. An apparatus for transferring fruit into storage bins so that the fruit does not mar during transfer is comprised of:
   an elongated conveyor system;
      where the elongated conveyor system is comprised of at least two parallel frame assemblies;
      where each of the frame assemblies is comprised of at least:
         an inlet portion, where the inlet portion is comprised of a near end and a far end; and an outlet portion where the outlet portion is comprised of a near end and a far end;
         where the inlet portions and the outlet portions are hinged together at the near ends;
      where each of the frame assemblies is comprised of an endless conveyor belt;
         where the conveyor belts are comprised of side flights and flat top based flights;
         where the conveyor belts rotate at a set speed;
   a directional brush assembly; where the directional brush assembly is comprised of directional brushes and a triangle projection;
      where the directional brush assembly is located at the inlet portion of the frame assemblies; and
   a discharge head;
      where the outlet portion of each of the frame assembly, far end is attached to the discharge head;
      where the discharge head has a rotation speed.

2. The apparatus of claim 1 where the hinged frame assemblies allow the discharge head to travel in a vertical direction.

3. The apparatus of claim 2 where the directional brush assembly has at least an on mode and an off mode.

4. The apparatus of claim 3 wherein the conveyor belts are turned on for a predetermined period of time.

5. The apparatus of claim 4 where the directional brush and triangular projection moves fruit from a supply conveyor to the framed assemblies, assuring equal loading onto each framed assembly.

6. The apparatus of claim 1 where the discharge head is comprised of a plurality of spokes attached to a hub; said discharge head rotates.

7. The apparatus of claim 6 where the hub is attached to a drive shaft; said drive shaft is attached to a gear box which synchronizes the speed of the conveyor belts with the rotation speed of the discharge head.

8. The apparatus of claim 7 where the rotation speed of the discharge head is set so that fruit does not collide with a spoke.

9. The apparatus of claim 8 where the rotation speed is set so that fruit does not collide with any part of the apparatus.

10. The apparatus of claim 6 where each spoke is dressed with an elephant ears.

11. The apparatus of claim 10 where each elephant ear is comprised of an attachment arm and a rectangular portion; said attachment arm comprises a means to mate with a section arm and said rectangular portion comprises a means to mate with a spoke.

12. The apparatus of claim 1 where the discharge head consists of 6 spokes.

13. The apparatus of claim 12 where each spoke consists of a sensor paddle.

14. The apparatus of claim 13 where each sensor paddle in combination with a drive shaft and a proximity switch search for a predetermined level of bin fill; when said predetermined fill is obtained, the directional brush assembly stalls the flow of fruit.

15. The apparatus of claim 1 where the elongated conveyor system is stationary.

16. The apparatus of claim 1 where the elongated conveyor system is articulated.

17. The apparatus of claim 1 further comprises a halo curtain where said halo curtain is comprised of a self-supporting frame and sits within a storage bin.

* * * * *